United States Patent
Brombach et al.

(10) Patent No.: US 9,942,971 B2
(45) Date of Patent: Apr. 10, 2018

(54) DETECTING OUTAGES IN A LED LAMP ASSEMBLY

(71) Applicant: Ford Global Technologies, LLC, Dearborn, MI (US)

(72) Inventors: Ronald Patrick Brombach, Plymouth, MI (US); John Barrs, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/236,915

(22) Filed: Aug. 15, 2016

(65) Prior Publication Data

US 2018/0049301 A1 Feb. 15, 2018

(51) Int. Cl.
| | |
|---|---|
| *B60Q 1/14* | (2006.01) |
| *H05B 37/03* | (2006.01) |
| *H05B 33/08* | (2006.01) |
| *B60Q 1/00* | (2006.01) |
| *F21S 8/10* | (2006.01) |
| *H05B 37/02* | (2006.01) |
| *B60Q 1/02* | (2006.01) |
| *B60Q 1/04* | (2006.01) |
| *F21Y 115/10* | (2016.01) |

(52) U.S. Cl.
CPC ......... *H05B 37/036* (2013.01); *B60Q 1/0088* (2013.01); *B60Q 1/02* (2013.01); *B60Q 1/04* (2013.01); *F21S 48/115* (2013.01); *H05B 33/083* (2013.01); *H05B 33/0803* (2013.01); *H05B 33/0815* (2013.01); *H05B 33/0821* (2013.01); *H05B 33/0848* (2013.01); *H05B 33/0884* (2013.01); *H05B 37/0254* (2013.01); *F21Y 2115/10* (2016.08)

(58) Field of Classification Search
CPC ............ H05B 33/0803; H05B 33/0815; H05B 33/083; H05B 33/0848; B60Q 1/00; B60Q 1/02; B60Q 1/04
USPC .......................................... 315/77, 80, 185 R
See application file for complete search history.

(56) References Cited

U.S. PATENT DOCUMENTS

| | | | |
|---|---|---|---|
| 4,667,187 A | 5/1987 | Volk et al. | |
| 4,808,975 A | 2/1989 | Hochhaus et al. | |
| 8,072,223 B1 | 12/2011 | Sioma | |

(Continued)

FOREIGN PATENT DOCUMENTS

| | | |
|---|---|---|
| CN | 204836752 U | 12/2015 |
| KR | 1020120066404 A | 6/2012 |

OTHER PUBLICATIONS

*LED Diagnosis in Automotive Applications*, May 2011, 10 Pages.
Search Report dated Feb. 6, 2018, for GB Patent Application No. 1712961.0 (6 pages).

*Primary Examiner* — Tung X Le
(74) *Attorney, Agent, or Firm* — James P. Muraff; Neal, Gerber & Eisenberg LLP

(57) ABSTRACT

Apparatus and systems are disclosed for detecting outages in an LED lamp assembly. An example disclosed lamp assembly includes a plurality of LED circuits serially connected together. The LED circuits include an LED, a first resistor and an optocouper. The example disclosed lamp assembly also includes a sense line electrically coupled to one of the LED circuits. The sense line has a first voltage value when all of LEDs in that plurality of LED circuits are operational and a second voltage value when at least one of the LEDs has failed.

14 Claims, 4 Drawing Sheets

(56) References Cited

U.S. PATENT DOCUMENTS

| | | | |
|---|---|---|---|
| 8,531,115 B2* | 9/2013 | Blanchard | H05B 33/0824 315/122 |
| 8,635,035 B2 | 1/2014 | De Oto et al. | |
| 2003/0117088 A1* | 6/2003 | Tanabe | H05B 33/0815 315/291 |
| 2003/0218436 A1 | 11/2003 | Higgins | |
| 2006/0170287 A1 | 8/2006 | Ito et al. | |
| 2007/0159750 A1* | 7/2007 | Peker | H05B 33/0869 361/93.1 |
| 2008/0204029 A1 | 8/2008 | Mihai et al. | |
| 2009/0021187 A1 | 1/2009 | Bhagat | |
| 2009/0237004 A1* | 9/2009 | Ploquin | H05B 33/083 315/294 |
| 2010/0109557 A1* | 5/2010 | Bouchard | H05B 33/0818 315/294 |
| 2010/0117656 A1 | 5/2010 | Snelten | |
| 2011/0169411 A1* | 7/2011 | Inoue | H05B 33/0815 315/82 |
| 2012/0146544 A1* | 6/2012 | Sauerlaender | H05B 33/083 315/294 |
| 2012/0206146 A1 | 8/2012 | Avenel | |
| 2014/0097849 A1 | 4/2014 | Brancken et al. | |
| 2014/0167951 A1 | 6/2014 | Schnorr | |
| 2015/0173133 A1* | 6/2015 | Seki | H05B 33/0818 315/185 R |
| 2015/0208476 A1* | 7/2015 | Muramatsu | H05B 33/0815 315/193 |

* cited by examiner

DETECTING OUTAGES IN A LED LAMP ASSEMBLY

TECHNICAL FIELD

The present disclosure generally relates to vehicle lighting systems and, more specifically, detecting outages in an LED lamp assembly.

BACKGROUND

Increasingly, vehicles are being equipped with lamp assemblies that contain multiple light emitting diodes (LEDs) instead of traditional incandescent or halogen lamps. Generally, LED lamp assemblies are more energy efficient and have a longer life. In some jurisdictions, an indicator is required when failure of one or more LEDs in a headlamp causes the light produced to drop below a regulated level (see *Uniform Provisions Concerning the Approval of Vehicles with regard to the Installation of Lighting and Light-Signalling Devices*, ECE Regulation 48).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for detecting outages in an LED lamp assembly. An example disclosed lamp assembly includes a plurality of LED circuits serially connected together. The LED circuits include an LED, a first resistor and an optocouper. The example disclosed lamp assembly also includes a sense line electrically coupled to one of the LED circuits. The sense line has a first voltage value when all of LEDs in that plurality of LED circuits are operational and a second voltage value when at least one of the LEDs has failed.

A example vehicle a headlamp power driver, a body control module, and a lamp assembly. The lamp assembly includes a sense line. The sense line has a first voltage value when all of a plurality of LEDs in the lamp assembly are operational and a second voltage value when at least one of the plurality of LEDs has failed.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
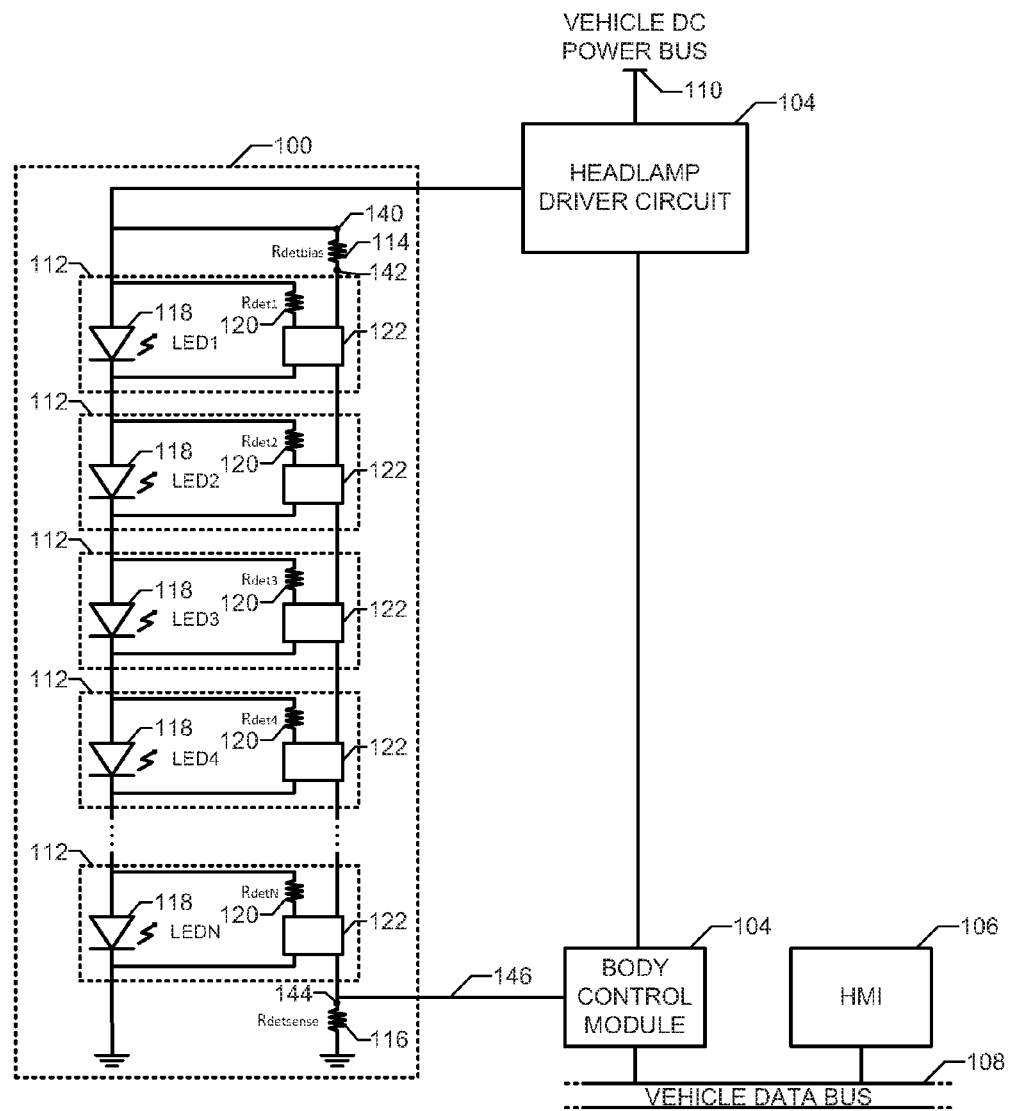
FIGS. 1A and 1B are diagrams of a system to detect outages in an LED lamp assembly in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

To achieve lighting output, light emitting diodes (LEDs) are serially connected. For example, a headlamp for a vehicle may include six to twelve serially connected LEDs to produce 700 lumens to 1200 lumens. These serially connected LEDs are driven by a constant current source which varies the bias voltage of the circuit to achieve a constant current through the LEDs. The variability of the bias voltage in influenced by the LED age, operating temperature of the LEDs, and tolerances of the LED characteristics. As a result, characterizing the current load of the serially connected LEDs is difficult.

When an LED fails, it fails (a) as an open circuit, (b) as a short circuit, or (c) as a resistive short. As disclosed below, serially connected detection circuits detect when at least one of the LEDs in the string of serially connected LEDs has failed. One of the detection circuits is electrically couple in parallel with the corresponding one of the LEDs. Additionally, the detection circuits are electrically coupled to a sense line that indicates when one of more of the LED have failed. The detection circuit includes a resistor (Rdet) and an optocoupler. The optocoupler includes an input LED and a phototransistor. When the corresponding headlamp LED is active, the input LED of the optocoupler is active and the phototransistor conducts current. When the corresponding headlamp LED fails as an open circuit, the forward voltage of the LED string causes a high voltage across the input LED of the optocoupler which will destroy the input LED. As a result, the phototransistor does not conduct current. When the corresponding headlamp LED fails as a short circuit, the forward voltage of the headlamp LED will cause low voltage across the input LED of the optocoupler. As a result, the phototransistor does not conduct current. When the corresponding headlamp LED fails as a resistive short, the voltage across the input LED will drop. As a result, the phototransistor restricts current flow on the sense line. When the current on the sense line is prevented (because of the phototransistor of one of the optocouplers not conducting current) or is reduced (because of the phototransistor of one of the optocouplers is restricting current), the voltage output of the sense circuit drops below a threshold.

Figure 1B:
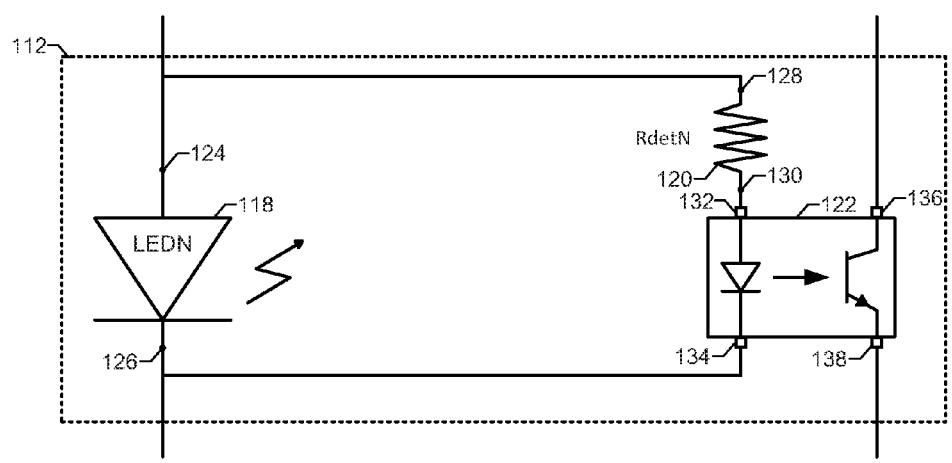

FIGS. 1A and 1B are diagrams of a system to detect outages in an LED lamp assembly 100 in accordance with the teachings of this disclosure. In the illustrated example, the system includes a headlamp driver circuit 102, the LED lamp assembly 100, a body control module 104, a human machine interface (HMI) 106, and a vehicle data bus 108. The headlamp driver circuit 102 is electrically coupled to a vehicle power bus 110. The headlamp driver circuit 102 includes components (e.g., resistors, capacitors, inductors, DC-to-DC power regulators, integrated circuits, etc.) to provide a constant current to the LED lamp assembly 100. In the illustrated example, the headlamp driver circuit 102 is controlled by the body control module 104 to activate and deactivate the LED lamp assembly 100.

The LED lamp assembly 100 includes LED-detection circuits 112, a bias resistor (Rdetbias) 114, and a sense resistor (Rdetsense) 116. The LED-detection circuits 112 are serially electrically coupled. In the illustrated example, the LED-detection circuits 112 include a headlamp LED 118, a detection resistor (Rdet) 120, and an optocoupler 122. When receiving current from the headlamp driver circuit 102, the headlamp LED 118 emits light. For example, the headlamp LED 118 may emit 300 lumens of light. The headlamp LED 118 has an anode terminal 124 and a cathode terminal 126. The detection resistor (Rdet) 120 has a first terminal 128 and a second terminal 130. A value (in ohms) of the detection resistor (Rdet) 120 is selected to match the characteristics of the headlamp LED 118 so that, when the headlamp LED 118 begins to resistively short, the input voltage of to the optocoupler 122 decreases.

The optocoupler 122 is electrically coupled to the headlamp LED 118. The optocoupler 122 has an anode terminal 132, a cathode terminal 134, a collector terminal 136, and an emitter terminal 138. The anode terminal 132 and the cathode terminal 134 are electrically coupled to an input LED of the optocoupler 122. The collector terminal 136 and the emitter terminal 138 are electrically coupled to a phototransistor of the optocoupler 122. When the voltage across the anode terminal 132 and the cathode terminal 134 satisfies (e.g., is greater than or equal to) a threshold voltage, the input LED emits light (e.g., infrared light) and the phototransistor allows current to flow between the collector terminal 136 and the emitter terminal 138. When the headlamp LED 118 fails as a short circuit, the input LED is not activated and current does not flow between the collector terminal 136 and the emitter terminal 138.

The optocoupler 122 is selected so that the threshold voltage of the input LED is less than the voltage that causes the headlamp LED 118 to emit light. For example, the voltage that to activate the headlamp LED 118 may be 3.25V and the voltage to activate the optocoupler 122 may be 2.2V. The optocoupler 122 and the detection resistor (Rdet) 120 are also selected so that when the headlamp LED 118 fails as an open circuit, the current through the input LED is high enough to break down the input LED. For example, the input LED may fail in response to current greater than 60 mA.

In the illustrated example of FIG. 1B, the anode terminal 124 of the headlamp LED 118 is electrically coupled to (i) the a first terminal 140 of the bias resistor (Rdetbias) 114 and the headlamp driver circuit 102 (e.g., the LED-detection circuit 112 is the first one), or (ii) the cathode terminal 126 of the previous LED-detection circuit 112. The cathode terminal 126 of the headlamp LED 118 is electrically coupled to (i) the anode terminal 124 of the next LED-detection circuit 112, or (ii) ground. The first terminal 128 of the detection resistor (Rdet) 120 is electrically coupled to the anode terminal 124 of the headlamp LED 118. The second terminal 130 of the detection resistor (Rdet) 120 is electrically coupled to the anode terminal 132 of the optocoupler 122. The cathode terminal 134 of the optocoupler 122 is electrically connected to the cathode terminal 126 of the headlamp LED 118. Additionally, the collector terminal 136 of the optocoupler 122 is electrically coupled to (i) a second terminal 142 of the bias resistor (Rdetbias) 114 (e.g., the LED-detection circuit 112 is the first one) or (ii) the emitter terminal 138 of the next LED-detection circuit 112. The emitter terminal 138 of the optocoupler 122 is electrically coupled to (i) the collector terminal 136 of the next LED-detection circuit 112 or (ii) a first terminal 144 of the sense resistor (Rdetsense) 116 and the sense line 146.

The bias resistor (Rdetbias) 114 and sense resistor (Rdetsense) 116 are selected so that (a) when any one of the optocouplers 122 of the LED-detection circuits 112 does not allow current to flow between the respective emitter terminal 138 and collector terminal 136, voltage on the sense line 146 is zero, and (b) when all of the optocouplers 122 of the LED-detection circuits 112 allow current to flow between the emitter terminals 138 and collector terminals 136, voltage on the sense line 146 is above a threshold voltage. For example, the threshold voltage may be 0.5V. The threshold voltage is selected to (a) be higher than expected transient voltage of the sense line 146 and (b) account for (i) the variable voltage of the voltage divider formed by the bias resistor (Rdetbias) 114 and sense resistor (Rdetsense) 116 due to the variable voltage supplied by the headlamp driver circuit 102, and (ii) the voltage tolerance of the input to the body control module 104. In such a manner, the sense line 146 of the LED lamp assembly 100 outputs a first voltage when one or more of the headlamp LEDs 118 have failed and a second voltage when all of the headlamp LEDs 118 have not failed.

The body control module 104 controls various subsystems of the vehicle. For example, the body control module 104 may control power windows, power locks, an immobilizer system, and/or power mirrors, etc. The body control module 104 includes processor(s) and circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 104 controls the headlamp driver circuit 102 to control (e.g., turn on, turn off, dim, etc.) the LED lamp assembly 100 of the vehicle based on input received by the HMI 106.

The body control module 104 includes a control circuit to monitor one or more sense lines 146 and to instruct the HMI 106, via the vehicle data bus 108, to act based on the status of the head lamp assembly 100. The control circuit may include any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). Additionally, in some examples, the control circuit includes physical memory (e.g., volatile memory, non-volatile memory, etc.) on which one or more sets of instructions, such as the firmware for operating the methods of the present disclosure can be embedded. For example, the control circuit may include RAM, EPROMs, EEPROMs, FLASH memory, and/or memristor-based solid-state memory.

The body control module 104 is electrically connected to the sense line 146. The body control module 104 determines the status (e.g., whether one or more of the headlamp LEDs 118 have failed, etc.) of the LED lamp assembly 100. If the sense line 146 indicates that at least one of the headlamp LEDs 118 has failed, the body control module 104 instructs the HMI 106 to provide an audio and/or visual indicator. In some examples, the body control module 104 instructs the HMI 106 to persistently provide the indicator when (a) an ignition switch of the vehicle is set to the on position, and (b) the sense line 146 indicates that at least one of the headlamp LEDs 118 has failed. In some examples, the body control module 104 is electrically coupled to multiple sense lines 146 from different LED lamp assemblies 100. For example, a first sense line 146 may be associated with a driver's side LED lamp assembly 100 and a second sense line 146 may be associated with a passenger's side LED lamp assembly 100. In some such examples, the body control module 104 provides instructions for separate indicators to the HMI 106. Alternatively, in some such example, the body control module 104 provides instructions to activate a signal indicator is any of the sense lines 146 indicate that one of the LED lamp assemblies 100 is experiencing a failure.

The HMI 106 provides an interface between the vehicle and a user (e.g., a driver, a passenger, etc.). The HMI 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the HMI 106 includes hardware (e.g., a processor or controller, memory, storage, etc.) and software (e.g., an operating system, etc.) for an infotainment system. Upon receiving instructions from the body control module 104, the HMI 106 provides an audio (e.g., via a sound system) and/or a visual indicator that at least one of the LED lamp assemblies 100 is experiencing a failure. For example, the HMI 106 may activate a light on the dashboard display or may provide a warning message on the center console display.

In the illustrated example, the vehicle data bus 108 includes one or more data buses wired throughout the vehicle. The vehicle data bus 108 communicatively couples the body control module 104 and the HMI 106. In some examples, the vehicle data bus 108 is implemented in accordance with the controller area network (CAN) bus protocol as defined by International Standards Organization (ISO) 11898-1. Alternatively or additionally, in some examples, the vehicle data bus 108 may include a Media Oriented Systems Transport (MOST) bus, or a CAN flexible data (CAN-FD) bus (ISO 11898-7).

The vehicle power bus 110 is electrically coupled to a power manager that regulates current and voltage from a battery and/or an alternator. The vehicle power bus 110 supplies DC power to various subsystems of the vehicle.

Figure 2:
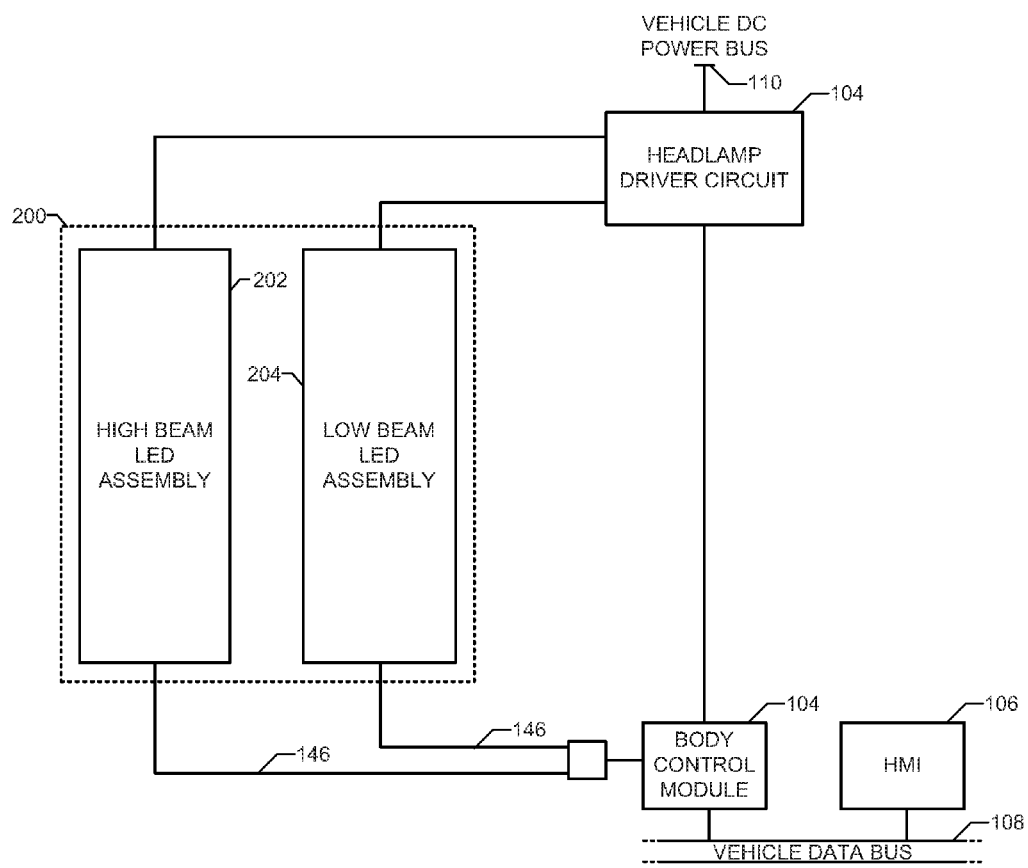
FIG. 2 is a block diagram of a hybrid LED lamp assembly.

FIG. 2 is a block diagram of a hybrid LED lamp assembly 200. The hybrid LED lamp assembly 200 includes multiple of the LED lamp assemblies 100 of FIG. 1A. In the illustrated example, the hybrid LED lamp assembly 200 includes a low beam LED assembly 202 and a high beam LED assembly 204. The hybrid LED lamp assembly 200 may also include other LED lamp assemblies 100, such as a fog lamp LED assembly and a turn signal LED assembly. The low beam LED assembly 202 provides a relatively low amount of light (e.g., 3000 lumens per assembly, etc.) and the high beam assembly 204 provides a relatively large amount of light (e.g., 9000 lumens per assembly, etc.). To achieve this, the low beam LED assembly 202 and the high beam assembly 204 may have a different number of LED-detection circuits 112 and/or may use different headlamp LEDs 118.

The body control module 104 separately controls the assemblies 202 and 204 via the headlamp driver circuit 102. Additionally, the assemblies 202 and 204 have separate sense lines 146. In some examples, the body control module 104 detects when either of the assemblies 202 and 204 experiences a failure and instructs the HMI 106 to provide a fault indicator. Alternatively, in some examples, the body control module 104 detects which one of the assemblies 202 and 204 is experiencing a failure and instructs the HMI 106 to provide a particularized fault indicator. For example, if the sense line 146 for the low beam LED assembly 202 indicates one of its headlamp LEDs 118 has failed, the body control module 104 may instruct the HMI 106 to provide a low beam fault indicator.

Figure 3:
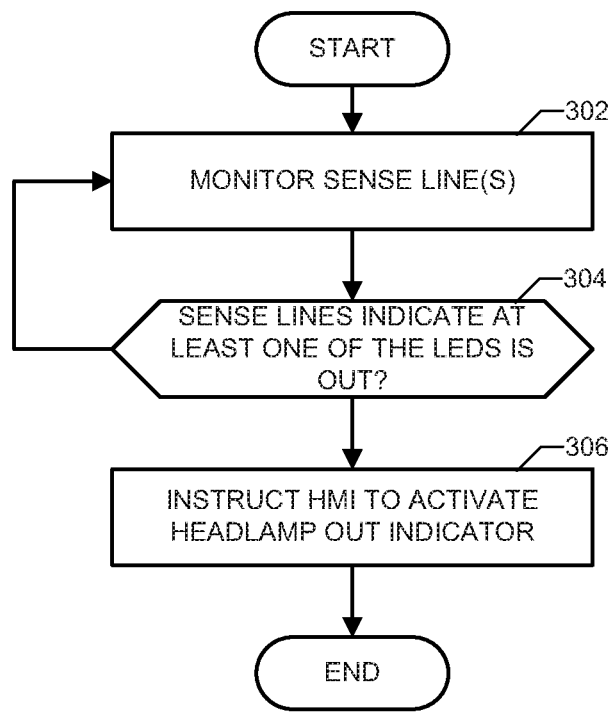
FIG. 3 is a flowchart of a method to detect outages in an LED lamp assembly.

FIG. 3 is a flowchart of a method to detect outages in an LED lamp assembly 100. Initially, at block 302, the body control module 104 monitors the sense line(s) 146. At block 304, the body control module 104 determines where the sense lines 146 indicate that at least one of the headlamp LEDs 118 is failing. The body control module 104 determines that at least one of the headlamp LEDs 118 is failing when the voltage on the sense line(s) 146 is below a voltage threshold. If the sense line(s) 146 indicate(s) that at least one of the headlamp LEDs 118 is failing, at block 306, the body control module 104 instructs, via the vehicle data bus 108, the HMI 106 to provide a fault indicator. Otherwise, if the sense line(s) 146 does/do not indicate that at least one of the headlamp LEDs 118 is failing, at block 302, the body control module 104 continues to monitor the sense line(s) 146.

The flowchart of FIG. 3 is a method that may be implemented by machine readable instructions that comprise one or more programs that, when executed, may implement the body control module 104 of FIGS. 1A and 2. Further, although the example program(s) is/are described with reference to the flowchart illustrated in FIG. 3, many other methods of implementing the example the body control module 104 may alternatively be used. For example, the order of execution of the blocks may be changed, and/or some of the blocks described may be changed, eliminated, or combined.

While the examples herein describe the detection circuit used with LED-based vehicle lighting, the example circuit may be used to detect outages in other contexts where LEDs are serially connected. For example, the example detection circuit may be used in consumer electronics, home lighting and/or Internet-of-Things applications.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A lamp assembly for a vehicle comprising:
   a plurality of LED circuits serially connected together, the LED circuits including an LED, a first resistor and an optocoupler, a first terminal of the first resistor being electrically coupled to an anode terminal of the LED, a second terminal of the first resistor being connected to an anode terminal of the optocoupler, and a cathode terminal of the LED being electrically connected to a cathode terminal of the optocoupler; and a sense line electrically coupled to one of the LED circuits, the sense line having a first voltage value when all of LEDs in that plurality of LED circuits are operational and a second voltage value when at least one of the LEDs has failed.

2. The lamp assembly of claim 1, including:

a second resistor electrically coupled to a first one of the plurality of LED circuits; and a third resistor electrically coupled to a second one of the plurality of LED circuits and the sense line.

3. The lamp assembly of claim 2, wherein the optocouplers of the plurality of LED circuits form a conductive path between the second and third resistors.

4. The lamp assembly of claim 3, wherein, when the LEDs are operating, the corresponding optocouplers conduct current, and wherein when one of the LEDs fails, the corresponding optocoupler does not conduct current.

5. The lamp assembly of claim 1, wherein a value of the first resistor is determined by an first activation voltage of the corresponding LED and a second activation voltage of the corresponding optocoupler.

6. The lamp assembly of claim 5, wherein the first activation voltage is greater than the second activation voltage.

7. A vehicle including:

a headlamp power driver;

a body control module; and a lamp assembly including:

a plurality of LED circuits serially connected together, the LED circuits including one of a plurality of LEDs, a first resistor and an optocoupler, a first terminal of the first resistor being electrically coupled to an anode terminal of the LED, a second terminal of the first resistor being connected to an anode terminal of the optocoupler, and a cathode terminal of the LED being electrically connected to a cathode terminal of the optocoupler; and a sense line that has a first voltage value when all of the plurality of LEDs in the lamp assembly are operational and a second voltage value when at least one of the plurality of LEDs has failed.

8. The vehicle of claim 7, including:

a second resistor electrically coupled to a first one of the plurality of LED circuits; and a third resistor electrically coupled to a second one of the plurality of LED circuits and the sense line.

9. The vehicle of claim 7, wherein the optocouplers of the plurality of LED circuits are electrically coupled between the second and third resistors.

10. The vehicle of claim 9, wherein, when the LEDs are operating, the corresponding optocouplers conduct current, and wherein when one of the LEDs fails, the corresponding optocoupler does not conduct current.

11. The vehicle of claim 7, wherein a value of the first resistor is determined by an first activation voltage of the corresponding LED and a second activation voltage of the corresponding optocoupler.

12. The vehicle of claim 7, wherein a first activation voltage is greater than a second activation voltage.

13. The vehicle of claim 7, wherein the body control module is to, in response to the sense line having the second voltage value, instruct a human machine interface to display an indicator that signifies that at least one of the LEDs has failed.

14. A vehicle comprising:

a headlamp power driver;

a lamp assembly with LEDS coupled to a single fault sense line via corresponding optocouplers that cause the sense line to have a first voltage when all the LEDs are operational and a second voltage when one of the LEDs has failed; and a body control module to, upon detecting the second voltage, instruct a display to activate an indicator signifying that one of the LEDs has failed.

* * * * *